(12) United States Patent
Devers et al.

(10) Patent No.: US 9,440,314 B2
(45) Date of Patent: Sep. 13, 2016

(54) LASER WELDING ASSEMBLY AND METHOD

(75) Inventors: Terry Devers, London (CA); John E. Hill, Shelby Township, MI (US); Harish Mistry, Troy, MI (US)

(73) Assignee: MAGNA INTERNATIONAL INC., Aurora, Ontario (CA)

( * ) Notice: Subject to any disclaimer, the term of this patent is extended or adjusted under 35 U.S.C. 154(b) by 261 days.

(21) Appl. No.: 14/111,823

(22) PCT Filed: Apr. 13, 2012

(86) PCT No.: PCT/CA2012/000366
§ 371 (c)(1),
(2), (4) Date: Dec. 30, 2013

(87) PCT Pub. No.: WO2012/139211
PCT Pub. Date: Oct. 18, 2012

(65) Prior Publication Data
US 2014/0124486 A1    May 8, 2014

Related U.S. Application Data

(60) Provisional application No. 61/475,925, filed on Apr. 15, 2011.

(51) Int. Cl.
*B23K 10/00* (2006.01)
*B23K 28/02* (2014.01)
*B23K 26/08* (2014.01)
*B23K 26/14* (2014.01)
*B23K 9/32* (2006.01)

(52) U.S. Cl.
CPC ............. *B23K 28/02* (2013.01); *B23K 9/32* (2013.01); *B23K 26/042* (2015.10); *B23K 26/0884* (2013.01); *B23K 26/1429* (2013.01); *B23K 26/1438* (2015.10); *B23K 26/242* (2015.10); *B23K 26/70* (2015.10)

(58) Field of Classification Search
CPC ............. B23K 28/02; B23K 26/0241; B23K 26/0884; B23K 26/1429; B23K 26/1452; B23K 26/243; B23K 9/32; B23K 26/42; B23K 10/02
USPC ...... 219/136, 137 R, 121.45, 121.46, 121.63, 219/121.64
See application file for complete search history.

(56) References Cited

U.S. PATENT DOCUMENTS

| | | | |
|---|---|---|---|
| 8,546,720 B2* | 10/2013 | Lin | B23K 26/1429 219/121.46 |
| 2001/0008231 A1* | 7/2001 | Britnell | B23K 26/032 219/121.63 |
| 2003/0108234 A1 | 6/2003 | Fujita et al. | |
| 2010/0078412 A1* | 4/2010 | Diez | B23K 26/1429 219/121.64 |
| 2010/0320174 A1 | 12/2010 | Hybinette et al. | |
| 2011/0089149 A1* | 4/2011 | Watanabe | B23K 26/1429 219/121.63 |

FOREIGN PATENT DOCUMENTS

| | | |
|---|---|---|
| CN | 101716701 A | 6/2010 |
| KR | 20060012809 A | 2/2006 |
| WO | 0138038 A2 | 5/2001 |

* cited by examiner

*Primary Examiner* — Mark Paschall
(74) *Attorney, Agent, or Firm* — Dickinson Wright PLLC

(57) ABSTRACT

A hybrid laser arc welding assembly including a gas metal arc welding torch and a laser arc welding laser head. The torch and laser head are disposed adjacent one another and aimed at targets of a pair of work pieces spaced from one another such that the melted material produced by the torch overlaps with the melted material produced by the laser head, and therefore, the torch and laser head combine to create a hybrid laser arc weld to join the work pieces. The laser head is adjustable dynamically relative to the workpieces to optimize the hybrid laser arc weld.

14 Claims, 6 Drawing Sheets

FIG. 7
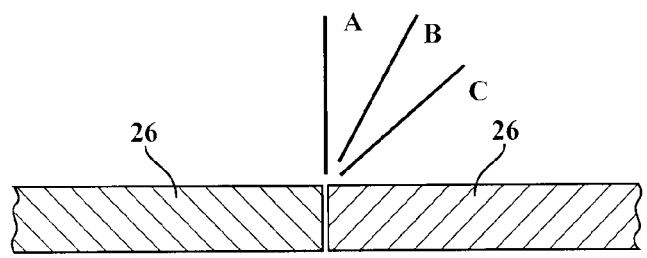
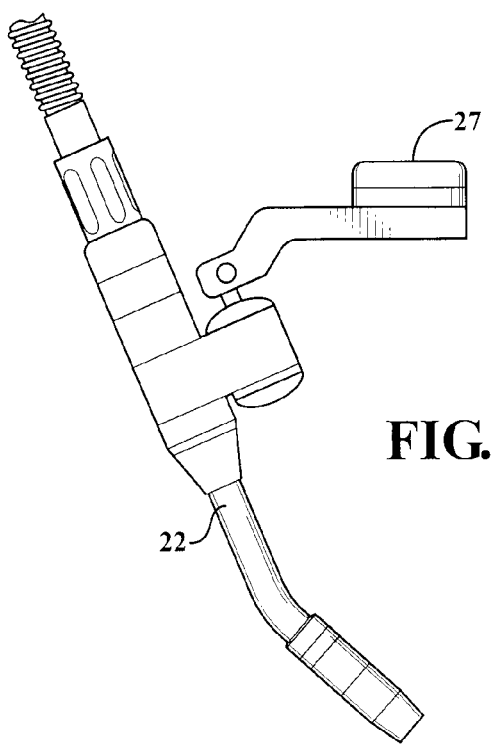
FIG. 8
FIG. 9
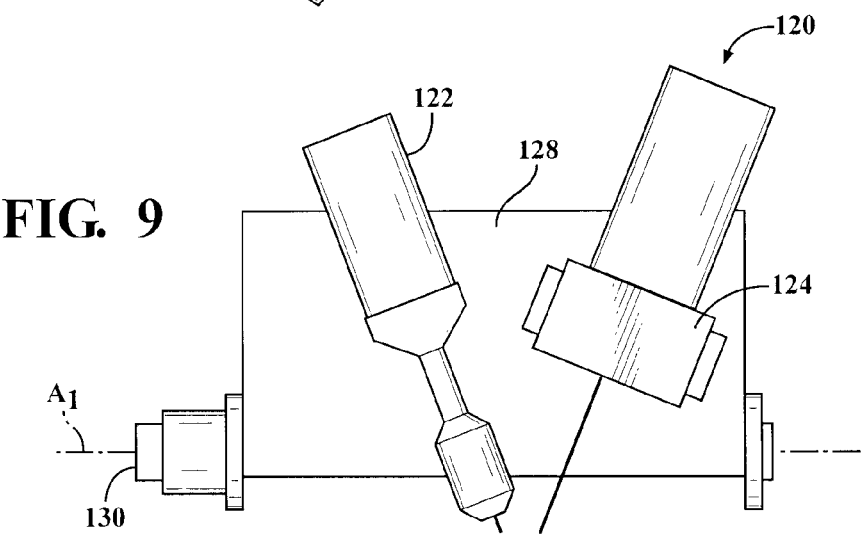

LASER WELDING ASSEMBLY AND METHOD

CROSS-REFERENCE TO RELATED APPLICATIONS

This U.S. National Stage Patent Application claims the benefit of International Application Number PCT/CA2012/000366 filed Apr. 13, 2012 entitled "Laser Welding Assembly And Method," which claims the benefit of U.S. Provisional Patent Application Ser. No. 61/475,925 filed Apr. 15, 2011, entitled "Laser Welding Assembly And Method," the entire disclosures of the applications being considered part of the disclosure of this application and hereby incorporated by reference.

BACKGROUND OF THE INVENTION

1. Field of the Invention

The subject invention is related to welding assemblies and methods. More specifically, the subject invention is related to a laser welding assembly and method.

2. Description of the Prior Art

Two common welding processes for joining two or more metal components are gas metal arc welding (GMAW) and laser beam welding (LBW). During the GMAW process, a wire electrode is fed into a torch, which melts the wire electrode at the intersection of, for example, two plates. The melted wire subsequently cools to join the two plates. A shielding gas is generally used to protect the welding area from atmospheric gasses which could otherwise compromise the integrity of the weld. Typical electrode wires are of silicon, manganese, titanium or aluminum materials, and typical shielding gases are inert gases, such as argon or helium. GMAW is sufficient for many applications, but generally produces a relatively shallow weld profile, which often must be built up to achieve desired structural characteristics of the weld. GMAW is also limited by the speed at which the wire electrode can be melted to form the weld.

During the LBW process, a laser head produces a continuous or pulsed high power density laser beam to melt the materials being joined. The spot size of the laser beam can be varied by adjusting the power wattage supplied to the laser head or by adjusting the focal point of the laser beam. LBW is advantageous because it can produce a weld with a deep penetration.

The combination of GMAW and LBW is generally referred to as hybrid laser arc welding (HLAW). The HLAW is advantageous since it results in an increase in both weld penetration depth and welding speed when compared to each process alone. Different joint configurations (e.g. lap joint, butt joint, T-joint, corner joint or edge joint) have different optimum orientations of the torch and laser head. Typical HLAW assemblies are setup in a specific joint configuration and can only be adjusted between welding operations with physical/manual effort, thereby limiting the effectiveness and the efficiency of the HLAW process.

There remains a significant and continuing need for an improved welding assembly for welding various joint configurations.

SUMMARY OF THE INVENTION

One aspect of the subject invention provides for a laser welding assembly and method for welding various joint configurations with a dynamically adjustable laser head. With the dynamically adjustable laser head, the assembly can efficiently and quickly weld plates of various materials (e.g., steel, aluminum and/or magnesium) into many different joint configurations. Further, the laser head can be moved to different angles on-the-fly during the welding operation to optimize the weld to weld complicated patterns. For example, dynamic adjustments of the laser head can adjust the amount of melt produced by the laser beam and/or the penetration of the laser beam during a single welding operation. Moreover, the laser head can be dynamically moved in a weaving pattern, which further increases the amount of melt produced by the laser beam along a joint.

The laser welding assembly could also be a hybrid laser arc welding (HLAW) assembly having a dynamically adjustable laser head and a torch which could either be non-adjustable or dynamically adjustable. If the torch is dynamically adjustable, it can either be adjusted along with the laser head or independent of the laser head to optimize the welding process.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7 is a side view showing three possible orientations of the laser head for welding a butt joint;

FIG. 8 is a side view of an exemplary torch;

FIG. 9 is a top view of a second exemplary embodiment of the hybrid laser arc welding assembly;

DETAILED DESCRIPTION OF THE ENABLING EMBODIMENTS

Figure 1:
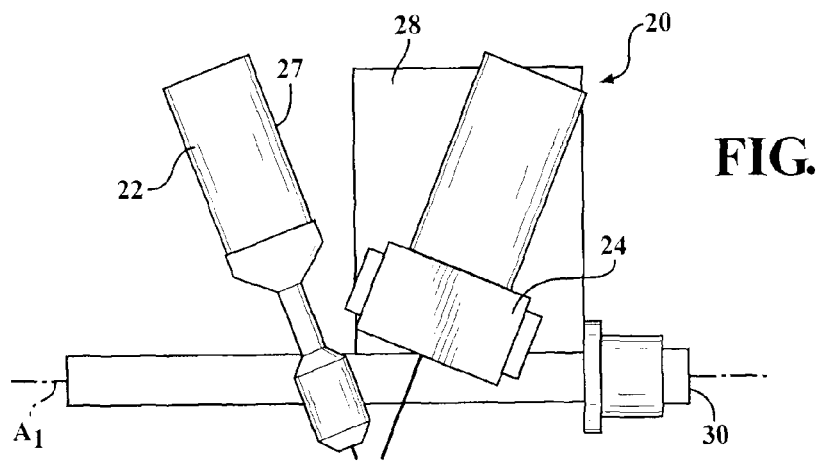
FIG. 1 is a top view of a first exemplary embodiment of the hybrid laser arc welding assembly.

Referring to the Figures, wherein like numerals indicate corresponding parts throughout the several views, an exemplary hybrid laser arc welding (HLAW) assembly 20 for producing a hybrid laser arc weld between at least two work pieces is generally shown in FIG. 1. The HLAW assembly 20 includes a torch 22 for gas-metal arc welding (GMAW) and a laser head 24 for laser beam welding (LBW). As will be discussed in greater detail below, the HLAW assembly 20 is dynamically adjustable to weld plates 26 (or any other types of metallic work pieces) into a variety of different joint configurations, such as lap joints (FIGS. 2-6), butt joints (FIG. 7), T-joints (not shown), corner joints (not shown) or edge joints (not shown). The components being joined can be of any desirable type of metal including, for example, steel, aluminum, magnesium and various alloys.

In operation, the HLAW assembly 20 is first positioned in front of an intersection between the plates 26 to be welded. The torch 22 and laser head 24 are then activated, and the HLAW assembly 20 is moved in a direction of travel along the interface of the two plates 26 by a robot (not shown). It may be desirable for the laser head 24 to lead the movement along the interface so that it can produce a deep penetrating weld while the torch 22 eliminates any undercutting in the materials. However, the torch 22 could lead the movement if desired.

The laser wattage and spot size of the laser head 24 are preferably chosen based on the material(s) being welded, the material thickness and the joint configuration. For example, the settings for the laser head 24 could be five kilowatts (5 kw) of power and a spot size of six hundred micrometers (600 μm) to weld one particular joint. Likewise, the shielding gas and the material of the wire electrode for the torch 22 are chosen based on the material of the plates 26 being welded, the plate thickness, the joint configuration, the wire electrode diameter, the wire feed speed, the travel speed, the power source type (direct current or alternating current) and the torch angle.

Figure 13:
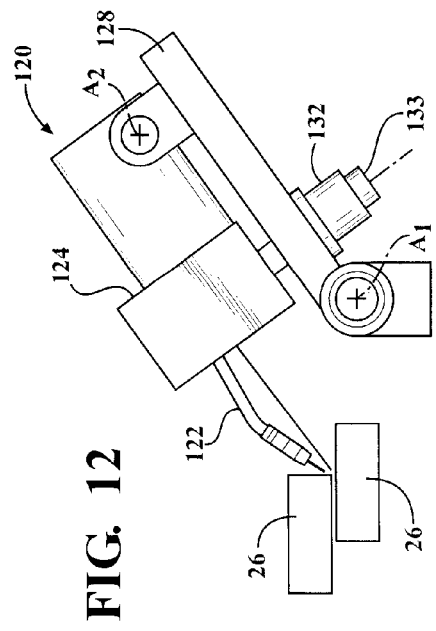
FIG. 13 is a side view of one of the exemplary embodiments of the hybrid laser arc welding assembly and showing the laser head oriented at a small angle.
Figure 14:
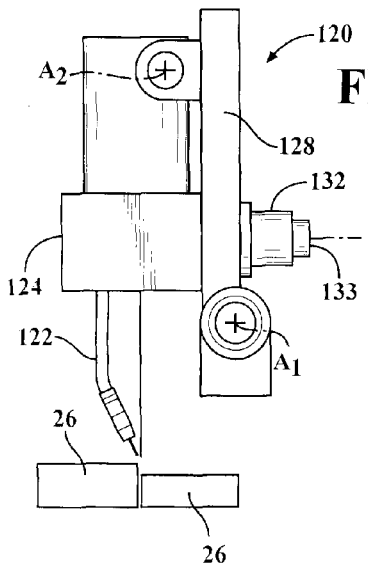
FIG. 14 is a side view of one of the exemplary embodiments of the hybrid laser arc welding assembly and showing the laser head oriented at approximately a 90° angle.
Figure 15:
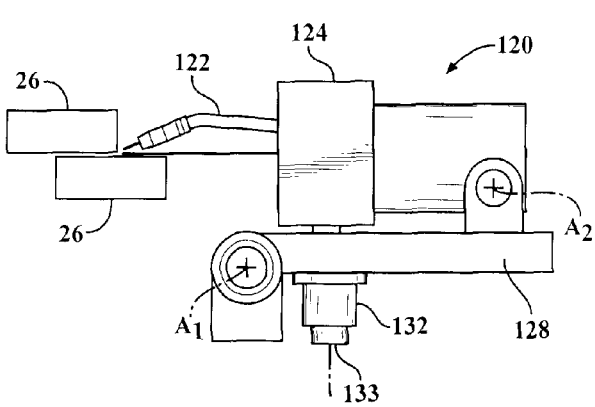
FIG. 15 is a side view of one of the exemplary embodiments of the hybrid laser arc welding assembly and showing the laser head oriented at a small angle.
Figure 16:
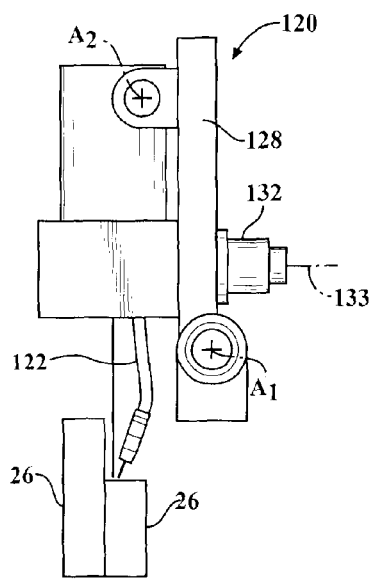
FIG. 16 is a side view of one of the exemplary embodiments of the hybrid laser arc welding assembly and showing the laser head oriented at approximately a 90° angle.

In the first embodiment of the HLAW assembly 20, as shown in FIG. 1, the torch 22 is mounted directly on the robot 27 (also shown in FIG. 8), and the laser head 24 is mounted on a table 28, which is attached to the robot 27. The torch 22 and laser head 24 are angled toward one another such that they are aimed at a point on the joint to be welded adjacent to one another. The torch 22 and laser head 24 are preferably angled relative to one another such that they are aimed at targets adjacent one another such that the melted material produced by the torch 22 overlaps with the melted material produced by the laser head 24 to produce a hybrid laser arc weld between the plates 26. Most preferably, the torch 22 and laser head 24 are aimed at targets with approximately a two millimeter (2 mm) pitch, or gap, between one another. This pitch may be beneficial since it allows both the torch 22 and laser head 24 to pass an area of the joint without the metal cooling therebetween. Alternately, the pitch between the torch 22 and laser head 24 could be less than four millimeters (4 mm). Both the torch 22 and laser head 24 are preferably positioned such that the push or drag angles of the torch 22 and laser head 24 are approximately fifteen degrees (15°). The table 28 of the first exemplary embodiment is rotatably coupled to the robot 27 about a first axis $A_1$, and a first servo motor 30 is operatively connected to the table 28 for rotating the table 28 relative to the robot 27. In the first exemplary embodiment, the first servo motor 30 is configured to rotate the table 28 to any orientation from a zero degree (0°) angle as shown in FIG. 13 to a ninety degree (90°) angle as shown in FIG. 16. A tool centering point (TCP) calibration may be performed each time the table 28 is rotated, between welding operations, or periodically to ensure a proper alignment of the torch 22 and the laser head 24.

Figure 2:
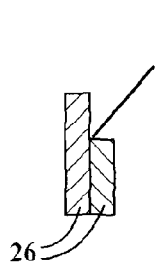
FIG. 2 is a side view of both the torch and the laser head welding a lap joint at approximately a 45° angle.
Figure 3:
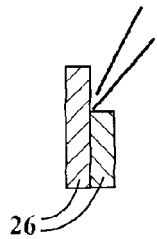
FIG. 3 is a side view of the torch welding a lap joint at approximately a 45° angle and the laser head welding the lap joint at a greater than 45° angle.
Figure 4:
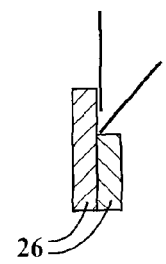
FIG. 4 is a side view of the torch welding a lap joint at approximately a 45° angle and the laser welding the lap joint at approximately a 90° angle.

As shown in FIG. 2, both the laser head 24 and the torch 22 are aimed at a lap joint formed between the plates 26 at approximately a forty-five degree (45°) angle. In FIG. 3, the table 28 supporting the laser head 24 has been rotated upwardly and the laser beam is striking the lap joint formed between the plates 26 at an angle greater than forty-five degrees (>45°). In FIG. 4, the table 28 supporting the laser head 24 has been rotated to a ninety degree (90°) degree angle. These are three orientations that are possible with the first exemplary embodiment because the orientation of the table 28 can be quickly and dynamically adjusted with the first servo motor 30, thereby altering the orientation of the laser head 24 relative to the torch 22. These adjustments can be made during a welding process or between welding processes.

Figure 5:
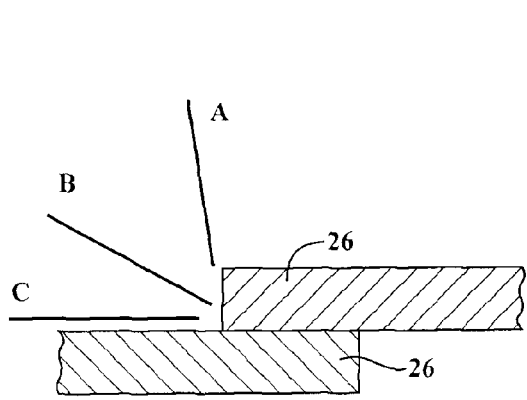
FIG. 5 is a side view showing three possible orientations of the laser head for welding a lap joint.
Figure 6:
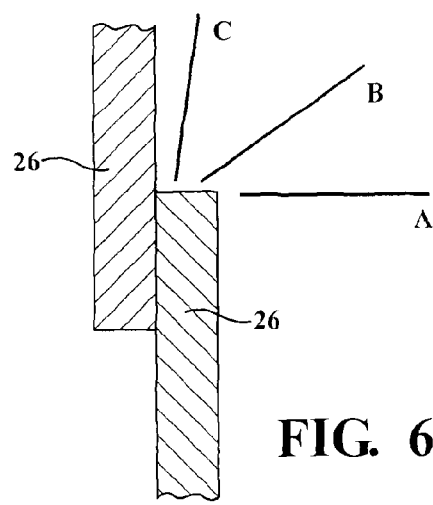
FIG. 6 is a side view showing three possible orientations of the laser head for welding a lap joint.

Referring now to FIGS. 5 and 6, three possible programmable angles of the laser head 24 for welding two plates 26 with a lap joint configuration are shown. The letter "A" designates a steep angle, the letter "B" designates a medium angle and the letter "C" designates a shallow angle. When the laser head 24 is oriented at the steep angle position ("A"), the laser beam will strike the upper of the plates 26 and create a volume of melt to help bridge the gap between the plates 26. The torch 22 then joins the melt with the lower of the plates 26 to strengthen the weld joint between the plates 26. When the laser head 24 is oriented at the medium angle position ("B"), the laser beam will strike the lower corner of the upper of the plates 26 and create a melt, which fills the gap between the plates 26. This will also provide for a deeper penetration by the laser beam at the interface of the two plates 26 as compared to the steep angle described above. Simultaneously to the laser beam creating the melt, the torch 22 fills any undercut produced by the laser. When the laser head 24 is oriented at the shallow angle position ("C"), the laser beam will produce a deep penetrating weld into the intersection of the two plates 26. Simultaneously, the torch 22 caps the weld with a bead and eliminates any undercutting. With the servo motor 30, the laser head 24 can quickly and dynamically be moved between positions "A", "B" and "C" to achieve the desired weld while the torch 22 is held at a constant orientation relative to the plates 26. A camera (not shown) or any type of sensor can be used to monitor the condition of the weld, and the orientation of the laser head 24 can be dynamically adjusted according to the condition of the weld.

Referring now to FIG. 7, three possible programmable angles of the laser head 24 for welding two plates 26 with a butt joint configuration are shown. Similar to FIGS. 5 and 6, the letter "A" designates a steep angle, the letter "B" designates a medium angle and the letter "C" designates a shallow angle. When the laser head 24 is oriented at the steep angle position ("A"), the laser beam will produce a deep penetrating weld into the intersection of the two plates 26 to be welded. Simultaneously, the torch 22 can be held at a ninety degree (90°) angle to cap the weld with a bead and eliminate any undercutting. When the laser head 24 is oriented at the medium angle position ("B"), the laser beam strikes one of the plates 26 and creates a melt to fill the gap between the plates 26 being welded. Simultaneously to the laser beam creating the melt, the torch 22 fills any undercut produced by the laser beam. When the laser head 24 is oriented at the shallow angle position ("C"), the laser beam strikes one of the plates 26 and creates a volume of melt to help bridge the gap between the two plates 26 being welded.

The laser head 24 can also be in communication with a controller (not shown) which controls the spot size of the laser beam and the power supplied to the laser head 24. A larger spot size has been found to stabilize the arc of the torch 22, whereas a narrower spot size generally produces a deeper weld penetration. A narrower spot size also tends to allow for higher travel speeds and thus, quicker welds.

Figure 10:
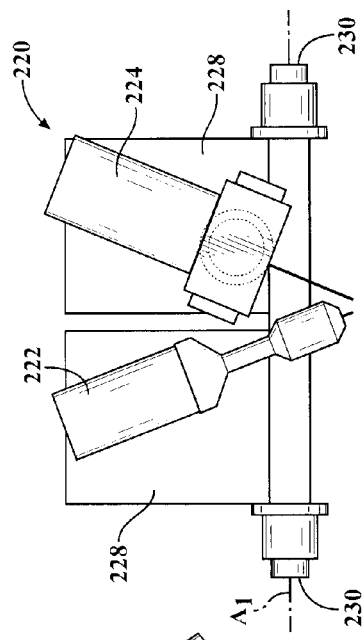
FIG. 10 is a side view of the second exemplary embodiment of the hybrid laser arc welding assembly showing the torch mounted to a plate.

A second exemplary embodiment of the HLAW assembly 120 is generally shown in FIGS. 9 and 10. In this exemplary embodiment, the torch 122 and laser head 124 are mounted on a common table 128. This arrangement allows the torch 122 and the laser beam to maintain a substantially constant pitch and orientation with respect to one another. The table 128 of the second exemplary embodiment is rotatably coupled to the robot 127 about a first axis $A_1$, and a first servo motor 130 is operatively connected to the table 128 for rotating the table 128. In this configuration, only a single TCP calibration is typically necessary to calibrate both the torch 122 and the laser head 124. The second embodiment is advantageous because it allows the torch 122 and laser head 124 to be quickly and dynamically adjusted together to weld any desirable joint configuration.

Figure 11:
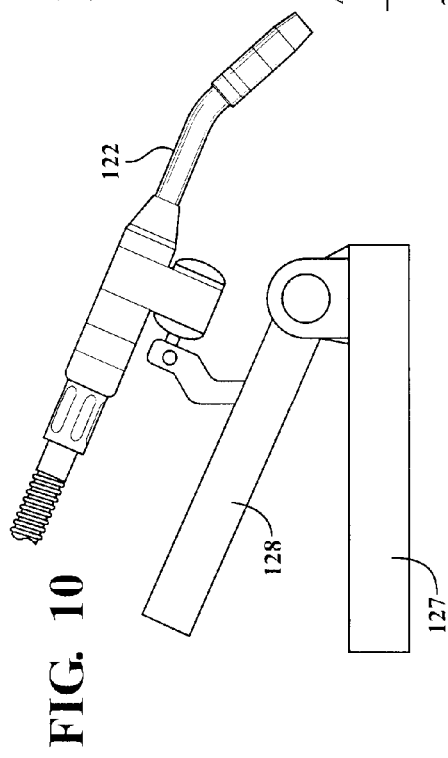
FIG. 11 is a top view of a third exemplary embodiment of the hybrid laser arc welding assembly.
Figure 12:
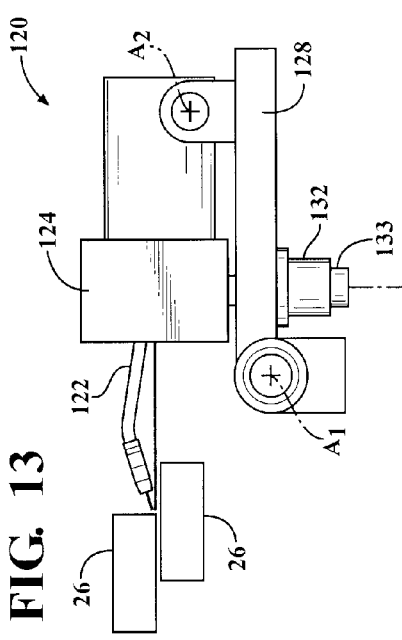
FIG. 12 is a side view of one of one of the exemplary embodiments of the hybrid laser arc welding assembly and showing the laser head oriented at approximately a 45° angle.

Referring now to FIG. 11, a third exemplary embodiment of the HLAW assembly 220 is generally shown. In this embodiment, the torch 222 and laser head 224 are mounted on separate tables 228, each independently rotatable about the first axis $A_1$. A first servo motor 230 is operatively coupled to the table 228 supporting the torch 222 for rotating the torch 222, and a second servo motor 230 is operatively coupled to the table 228 supporting the laser head 224 for rotating the laser head 224. A TCP calibration may be performed for each movement of either table 228 in order to calibrate the torch 222 and laser head 224 separately. The third embodiment is advantageous because it allows the torch 222 and laser head 224 to be dynamically adjusted independently of one another to optimize the weld for any desirable joint configuration.

FIGS. 12-24 show additional features of the second exemplary embodiment, though these features are also applicable to the first and third exemplary embodiments. A trunnion 132, or a lift, could be operatively coupled to the laser head 124 for rotating the laser head 124 about a second axis $A_2$. A trunnion servo motor 133 is operatively coupled to the trunnion 132 for controlling the amount of rotation of the laser head 124 about the second axis $A_2$. With the trunnion 132 and the trunnion servo motor 133, the laser head 124 can be swung independently of the torch 122 and can be oriented to heat the plates 26 at an angle independent of the torch 122. The trunnion 132 could be moved to reposition the laser head 124 either after the table 128 is adjusted or simultaneous to the dynamic adjustment of the table 128. Thus, the trunnion 132 and trunnion servo motor 133 provide an additional degree of freedom for adjusting the laser head 124.

Since the trunnion 132 is coupled to the laser head 124 of the second embodiment (with the torch 122 and laser head 124 mounted on a common table 128), the table 128 could be reciprocated in opposite directions to move the torch 122 in a "weaving" motion and produce a thicker weld. While the common table 128 is being reciprocated, the trunnion servo motor 133 could function to hold the laser head 124 steady, and therefore, the laser head 124 continues to produce a deep weld between the plates 26. In other words, during this process, the torch 122 is weaving while the laser beam moves in a straight line with the trunnion servo motor 133 countering the reciprocation of the common table 128 supporting both the torch 122 and the laser head 124.

Figure 17:
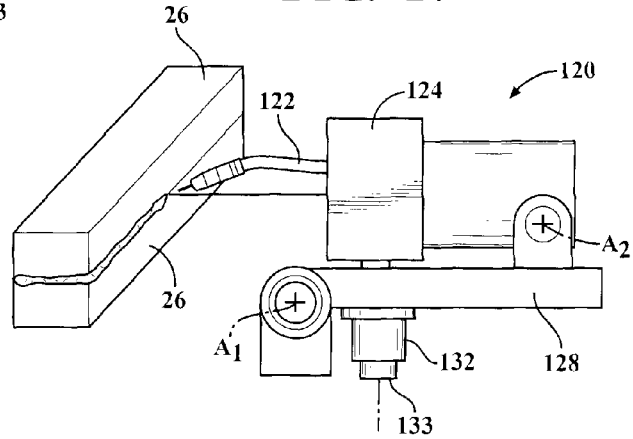
FIG. 17 is a side view of one of the exemplary embodiments of the hybrid laser arc welding assembly with the laser head moving through a weaving pattern.
Figure 18:
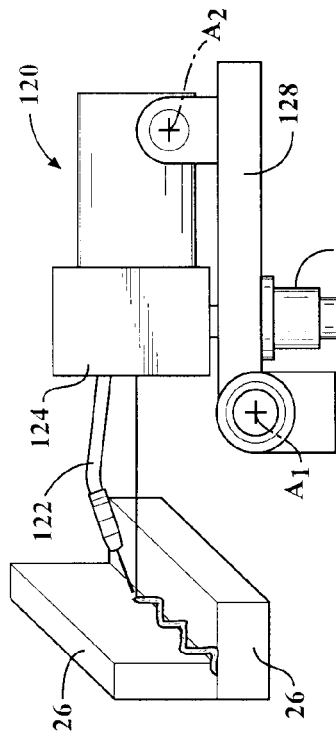
FIG. 18 is another side view of one of the exemplary embodiments of the hybrid laser arc welding assembly with the laser head moving through a weaving pattern.
Figure 19:
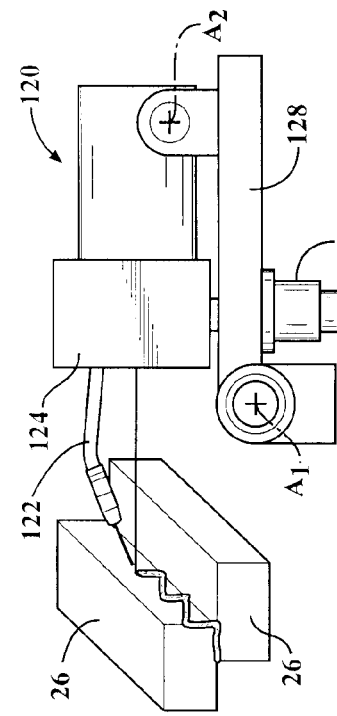
FIG. 19 is another side view of one of the exemplary embodiments of the hybrid laser arc welding assembly with the laser head moving through a weaving pattern.
Figure 20:
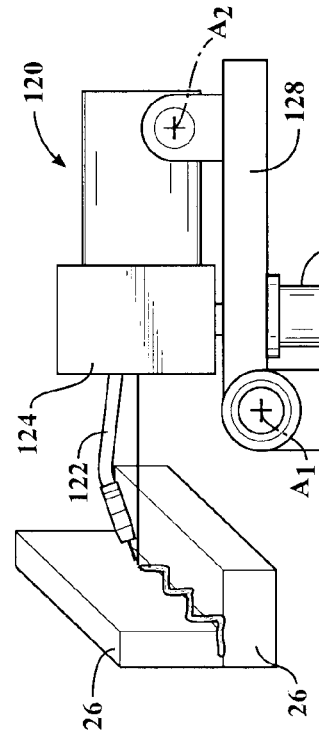
FIG. 20 is a side view of one of the exemplary embodiments of the hybrid laser arc welding assembly with the laser head moving through a curved pattern.
Figure 21:
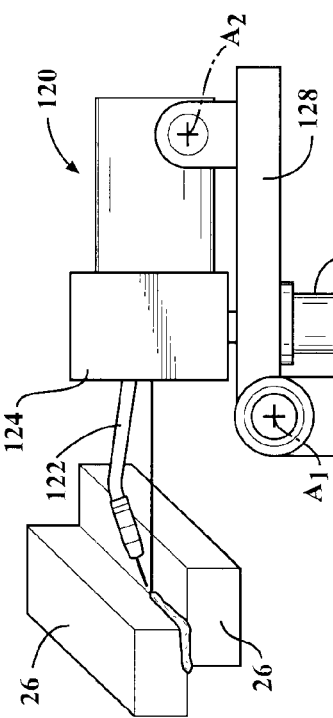
FIG. 21 is another side view of one of the exemplary embodiments of the hybrid laser arc welding assembly with the laser head moving through a curved pattern.
Figure 22:
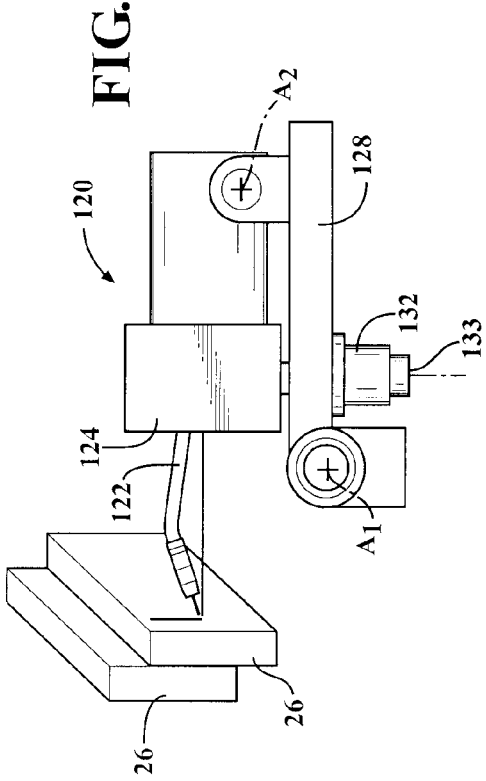
FIG. 22 is a side view of one of the exemplary embodiments of the hybrid laser arc welding assembly with the laser head moving through a stitching pattern.
Figure 23:
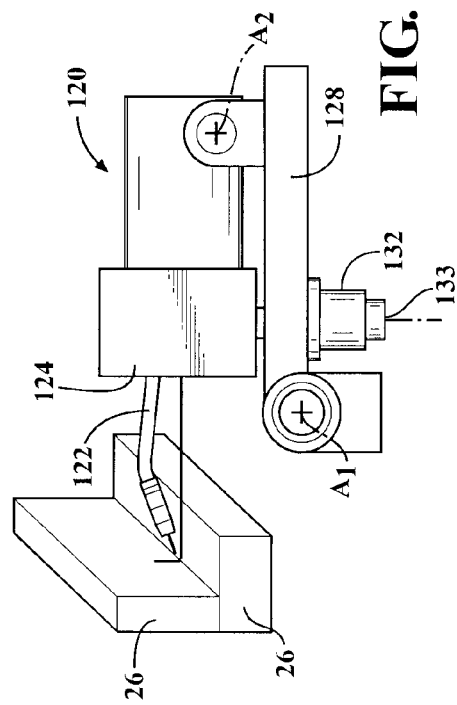
FIG. 23 is another side view of one of the exemplary embodiments of the hybrid laser arc welding assembly with the laser head moving through a stitching pattern.

Alternatively, the laser head 124 can be moved in a weaving motion by the trunnion servo motor 133 while the torch 122 remains in a constant orientation. This could be advantageous in creating additional melt with the laser beam without increasing spot size, which would otherwise result in reduced weld penetration. When additional melt is no longer required, the trunnion servo motor 133 could stop the weaving motion. FIGS. 17-19 show the laser head 124 producing such a weaving pattern. Alternately, as shown in FIGS. 20-21, the laser head 124 could be guided to follow a curve or a feature in a part to be welded while the torch 122 is maintained in a stable orientation. Even further, as shown in FIGS. 22-23, the laser head 124 could be moved to perform a stitch operation while the torch 122 is maintained in a stable orientation or vice versa.

Figure 24:
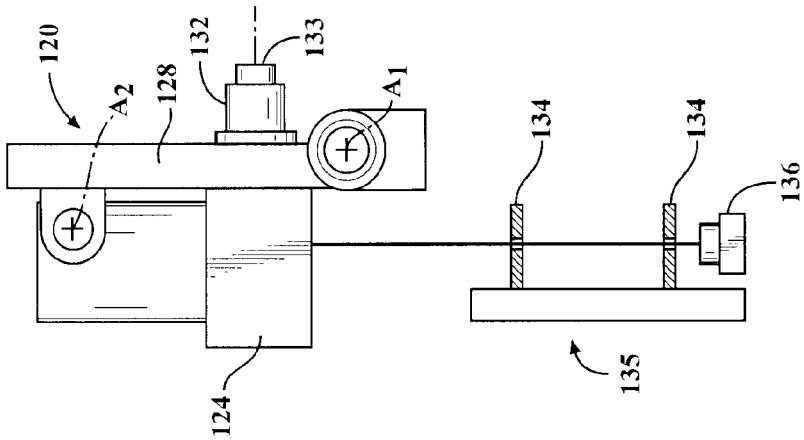
FIG. 24 is a side view of an exemplary tool center position calibrating setup.

Referring now to FIG. 24, an exemplary laser TCP station 135 for calibrating the laser head 124 is shown. The TCP station 135 includes two spaced alignment plates 134 of a low melting point material, e.g. aluminum. During the initial setup of the TCP station 135, alignment holes are burned into these plates 134 with the laser head 124. A temperature sensor 136 is then aligned with the two alignment holes in the alignment plates 134. During the TCP process, the laser head 124 is moved into the position shown in FIG. 24, and the laser head 124 is activated. If the laser beam passes through both of the alignment holes, then the temperature sensor 136 will report that the laser head 124 is properly aligned. If the temperature sensor 136 does not detect the laser beam, then the laser head 124 is either not functioning properly or is misaligned and must be re-aligned to calibrate the assembly 120.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A hybrid laser arc welding assembly, comprising:
a laser head aimed at a laser target for producing a laser beam to melt material of at least two metal work pieces to be joined;
a torch having a wire electrode aimed at a torch target for forming a metal arc between said wire electrode and the at least two work pieces to melt material of the at least two work pieces;
said laser and torch targets being adjacent one another such that the melted material produced by said laser head overlaps with the melted material produced by said torch to produce a hybrid laser arc weld between the at least two work pieces; and
a servo motor operably coupled to said laser head and configured to adjust an orientation of said laser head relative to said torch such that said laser target moves relative to said torch target during operation of said hybrid laser arc welding assembly and such that the material melted by said laser head remains overlapped with the material melted by said torch.

2. The hybrid laser arc welding assembly as set forth in claim 1 wherein said laser head and said torch are aimed at targets separated by a pitch of no greater than two millimeters.

3. The hybrid laser arc welding assembly as set forth in claim 1 further including a table supporting said laser head and pivotable about a first axis by said servo motor.

4. The hybrid laser arc welding assembly as set forth in claim 3 further including a trunnion and a trunnion servo motor operably coupled to said table and said laser head for pivoting said laser head about a second axis spaced from said first axis.

5. The hybrid laser arc welding assembly as set forth in claim 3 wherein both said laser head and said torch are supported by said table.

6. The hybrid laser arc welding assembly as set forth in claim 3 wherein said laser head and said torch are supported by separate tables which may be reoriented independently of one another.

7. The hybrid laser arc welding assembly as set forth in claim 1 wherein said torch and laser head are angled relative to one another.

8. The hybrid laser arc welding assembly as set forth in claim 1 wherein said torch and laser head are operably coupled to a robot for moving relative to the work pieces.

9. A method of welding at least two work pieces together, comprising the steps of:
positioning at least two work pieces such that the work pieces meet at an intersection;
melting material of the work pieces with a laser beam from a laser head that is aimed at a laser target;
melting material of the work pieces with a wire electrode of a gas metal arc welding torch that is aimed at a torch target that is spaced from the laser target;
the melted material from the laser beam overlapping with the melted material of the wire electrode;
moving the laser head and the torch relative to the work pieces along the intersection; and
adjusting an orientation of the laser head relative to the torch as the laser head and torch move along the intersection between the workpieces to move the laser target relative to the torch target while maintaining the overlapping of the melted material from the laser beam and the melted material from the wire electrode.

10. The hybrid laser arc welding assembly as set forth in claim 1 wherein said servo motor is configured to pivot the orientation of said laser head about a pivot axis that is spaced from a focus point of the laser head.

11. The method as set forth in claim 9 wherein the adjusting of the orientation of the laser head is further defined as pivoting the laser head about a first axis.

12. The method as set forth in claim 11 further including pivoting the orientation of the laser head about a second axis spaced from the first axis.

13. The method as set forth in claim 9 further including the step of oscillating the laser head in opposite directions while holding the torch at a constant orientation during the movement of the laser head and torch relative to the work pieces.

14. The method as set forth in claim 9 wherein the step of adjusting an orientation of the laser head relative to the torch is further defined as pivoting the laser head about a pivot axis that is spaced from a focus point of the laser head.

* * * * *